Oct. 10, 1950  W. F. WEBER  2,525,327
APPARATUS FOR CONVEYER LUBRICATION
Filed March 14, 1947  4 Sheets-Sheet 4
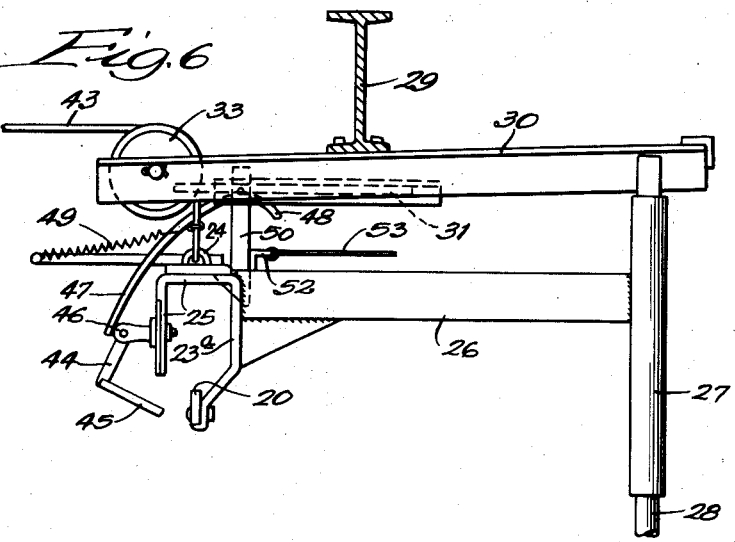
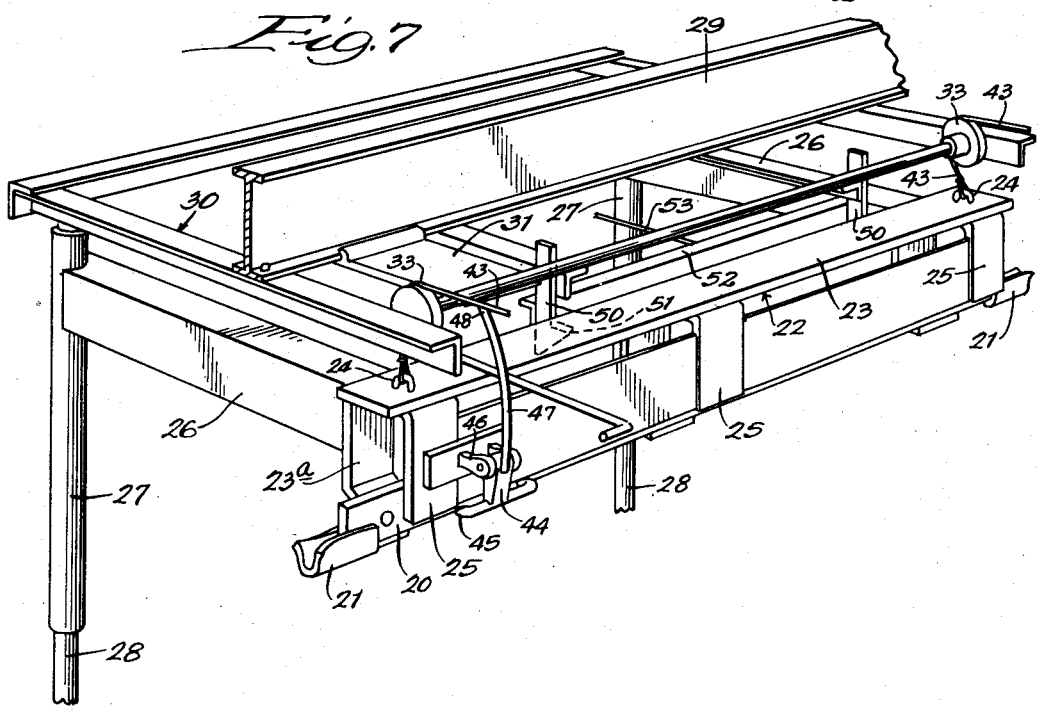
Inventor:
William F. Weber,
By Carl C. Batz
Attorney.

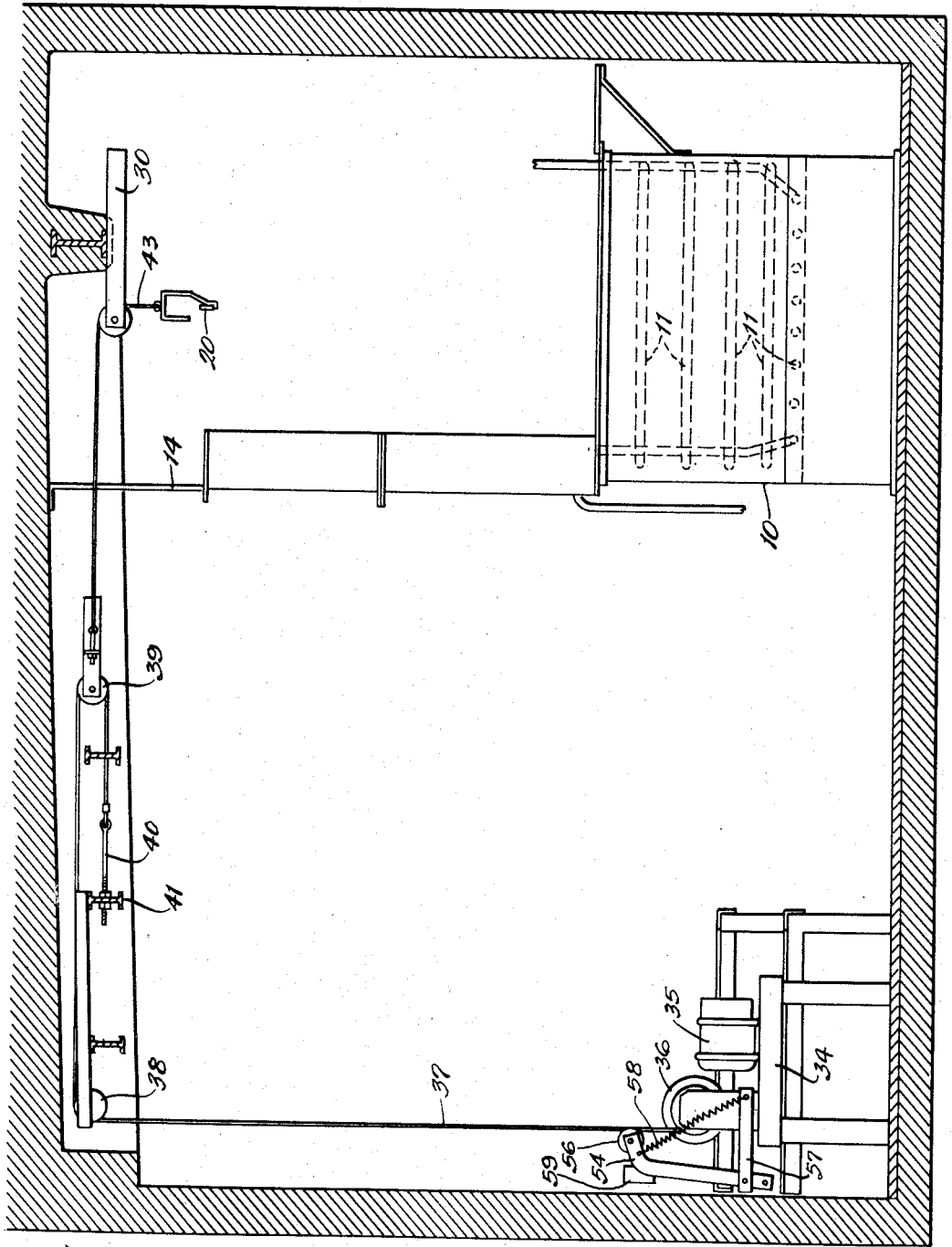

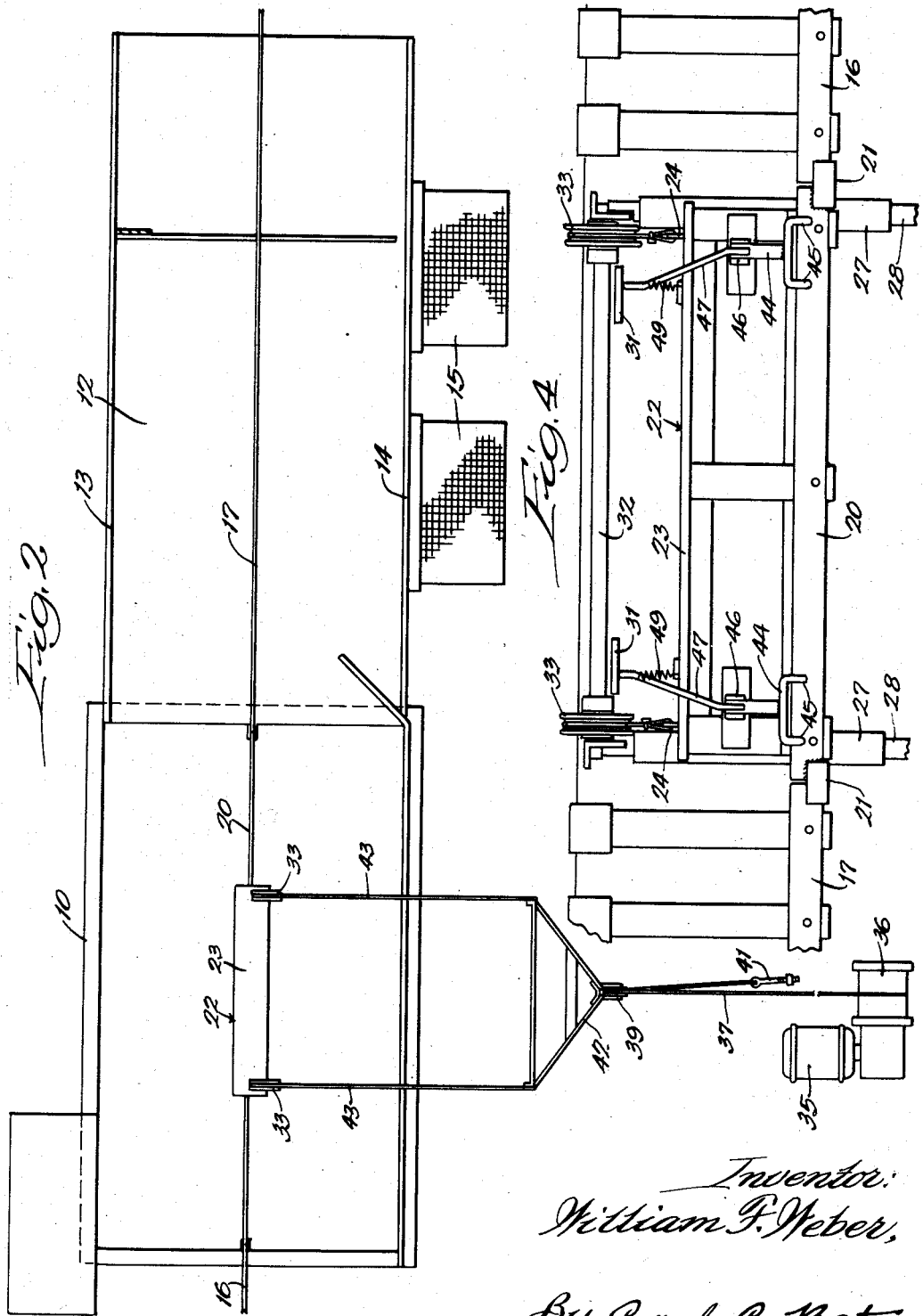

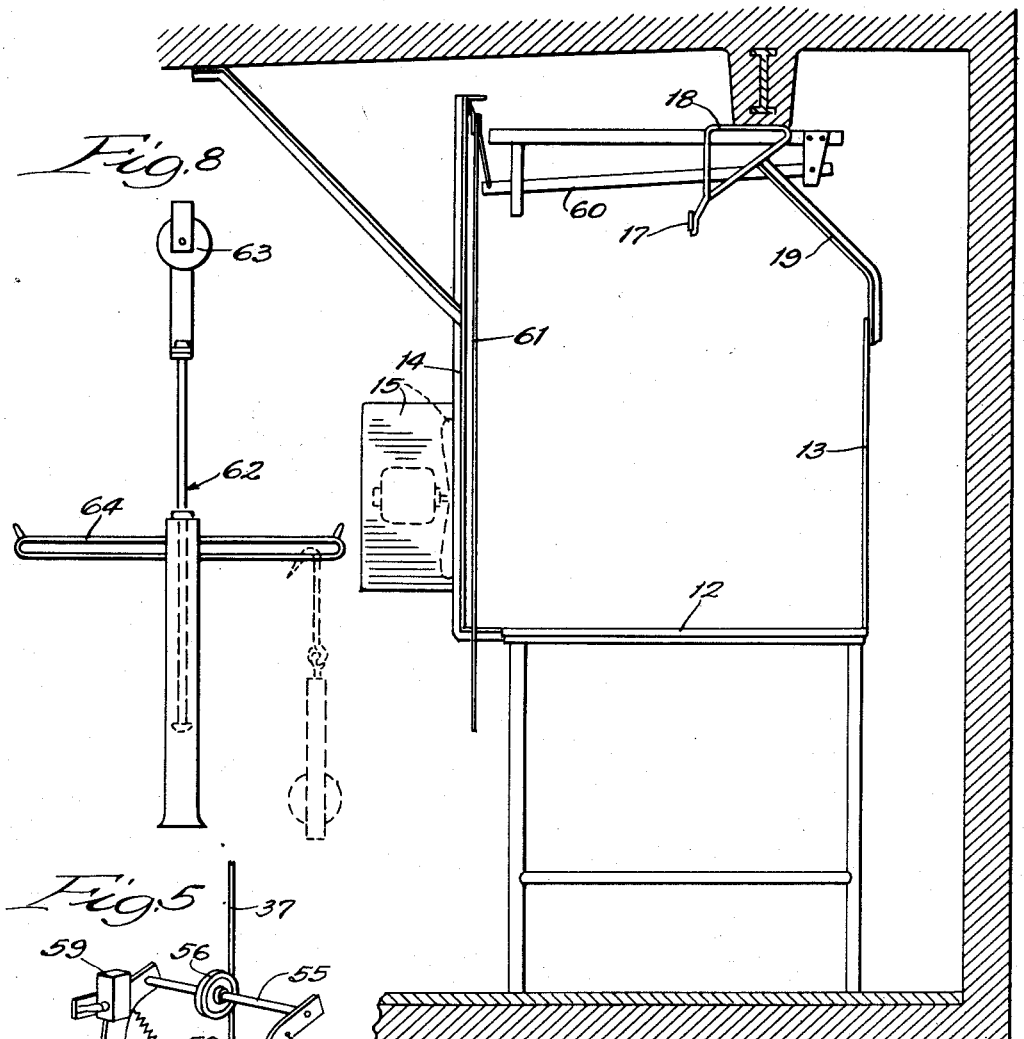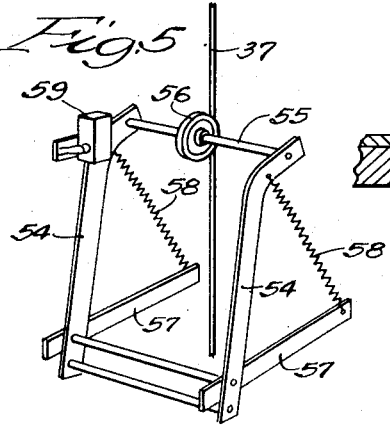

Patented Oct. 10, 1950

2,525,327

UNITED STATES PATENT OFFICE 2,525,327

APPARATUS FOR CONVEYER LUBRICATION

William F. Weber, Chicago, Ill., assignor to Armour and Company, Chicago, Ill., a corporation of Illinois Application March 14, 1947, Serial No. 734,837

2 Claims. (Cl. 104—93)

This invention relates to apparatus for metal treatment. It is particularly useful in connection with the treatment of trolleys, metal gambrels, and other apparatus used for supporting and conveying meat.

In packing house operations, meat, etc., is normally carried upon trolleys mounted upon tracks, and, since the meat is suspended below the trolleys, the problem of lubricating the trolleys without injury to the meat, and further the problem of enabling workmen to handle the trolleys without causing lubricant to cling to their hands, are serious problems and problems which have not been solved up to this time.

The common practice is to tumble the trolleys, gambrels, etc., in a revolving steel cylinder with leather findings, sawdust, or cleaning compound, and then to coat the trolleys, etc., with oil. Under the vibrations to which the trolleys are subjected at times, and also under temperature changes, drops of oil fall from the trolleys and onto the meat. Furthermore, workmen handling the equipment get their hands oily and, when they later handle meat, often contaminate the meat and thus produce further loss. A slight drop of oil on a piece of meat causes the piece to be rejected when the same is inspected, and before the piece is passed on inspection a large chunk of meat greater than the spot covered by oil has to be removed, thus producing waste, expense, and a marring of the meat portion.

An object of the present invention is to overcome the above disadvantages and to provide effective apparatus in which the trolleys and other equipment are provided with lubrication, while at the same time preventing the possibility of lubricant being transferred to the meat. Yet another object is to provide apparatus of simple and highly effective construction for handling trolleys for ready immersion in a lubricant bath for the effective lubrication thereof without any tendency of the lubricant to fall off. Still another object is to provide improved means whereby trolleys can be conveyed upon a segmental track and immersed in a heated wax bath while providing a safeguard against the injury of employees in the plant and against the splashing of the molten wax. Other specific objects and advantages will appear as the specification proceeds.

The invention is illustrated, in specific embodiments, by the accompanying drawings, in which Figure 1 is a side view in elevation of apparatus embodying my invention, the trolley-supporting mechanism being shown free of guiding mechanism; Fig. 2, a top plan view; Fig. 3, an end view in elevation and partly in section; Fig. 4, a broken front view in elevation of the segmental track support; Fig. 5, a broken perspective view of the hoist control device; Fig. 6, a side view in elevation of the elevator or segmental track device; Fig. 7, a perspective view of the elevating or segmental track device; and Fig. 8, a side view in elevation of a trolley tree adapted to be supported upon the segmental track and to carry a plurality of gambrels, trolleys, etc., for lubrication.

In the illustration given, 10 designates a tank adapted to receive molten wax and provided with steam coils 11 for maintaining the wax mixture at the desired temperature.

Extending laterally from the tank 10 is an inclined drain chute 12 adapted to receive the wax dripping from the immersed trolleys or gambrels and to direct it back into the tank 10. A guard wall 13 is provided along one side and a rear guard wall 14 is provided along the other side so as to prevent splashing of the hot liquid as it drips from the trolleys or gambrels. A pair of blowers 15 is supported along one side of the compartment 12 so as to cool the material.

Extending on one side of the tank 10 and partly over the same is a fixed track 16. A similar fixed track 17 extends from the other side of tank 10 over the drip compartment 12. The tracks 16 and 17 may be supported in any suitable manner from the stationary structure of the building. As illustrated best in Fig. 3, the track 17 may be supported by a bracket structure 18 which maintains the track at one side of the supporting structure 18. A brace 19 connected to the structure 18 reinforces the guard structure 13.

Extending between the tracks 16 and 17 is a segmental track portion 20, and the track at each end is provided with a U-shaped coupling member 21 open at its top and adapted to provide a connection with the adjacent fixed track when the segmental track 20 is brought into alignment therewith. Tracks 16 and 17 are so mounted as to permit a slight amount of upward movement as the segmented portion 20 comes up against them. The segmental track 20 is supported by a frame 22, as shown more clearly in Fig. 7. The frame 22 consists of an upper beam 23 having metal loops 24 at each end thereof, and the beam 23 is provided with depending metal straps 25. The beam 23 has spaced depending straps 23ª supporting the track 20, as shown in Fig. 6. The frame 22 is also provided with laterally-extending beams 26 welded to guide sleeves 27 receiving vertical guide posts 28. By this means, the track 20 is prevented from tilting or swinging when the same is raised and lowered.

In the illustration given, an I-beam 29 is supported by the plant structure and has its lowermost flanges secured to a stationary frame 30. The frame 30 carries the fixed guide posts 28 and also provides a pair of transverse plates 31.

In the frame 30, as shown best in Fig. 4, a shaft 32 is mounted, and upon the ends of the shaft are rotatably supported the pulleys 33.

Any suitable means for raising and lowering the segmental track 20 may be employed. In the illustration given, I provide upon a frame 34 a motor 35 and a cable drum 36 driven by said motor through reduction gears. The drum 36 carries a cable 37 which extends upwardly over the pulley 38 and thence about a second pulley 39. The end of the cable 37 is connected to an I-bolt 40 secured to the I-beam 41, as shown best in Fig. 1. The pulley 39 is carried within a V-shaped bracket 42 and through the ends of the bracket 42 extend the cables 43. The cables 43 extend over the pulleys 33 and are connected to the metal loops 24 of the beam 23.

In order to secure the trolley tree which is to be moved downwardly into the molten bath firmly upon the track 20, I provide a locking member 44 having arms 45 adapted to extend inwardly and engage the outer ends of the trolley arm. The member 44 is pivotally mounted upon ears 46, as shown best in Fig. 7, and secured to the upper end of the member 44 is an actuating arm 47 having a curved upper end portion 48 adapted to engage one of the plates 31. The spring 49 tends to draw the arm 47 outwardly when the curved upper end 48 of arm 47 is released from engagement with the plate 31. Any number of the locking members 44 may be employed to take care of the number of trolleys carried upon the segmental track 20.

Should the cable break and the structure 22 drop into the molten bath below, the molten bath would be thrown about the plant floor and would present a serious danger to employees. As a means for preventing such a disaster, I provide pivoted catches 50 having hooks 51 at their lower ends adapted to engage the underside of the beam 23. The catches 50, as shown best in Fig. 7, are connected by a bar 52 to which is secured a chain or cable 53. Thus, the catch 50 can be manually actuated to retract the same when it is desired to allow the segmental track 20 to be lowered. At the same time, it automatically hooks under the beam 23 when the structure 22 is raised, as shown best in Figs. 6 and 7.

In order to control the hoist motor 35, I provide a pair of pivotally-mounted members 54 having a shaft 55 secured thereto and bearing a pulley 56. The pulley receives the cable 37. The members 54 are pivotally mounted upon the frame members 57 and are normally urged in a forward direction by the springs 58 against the cable 37. The members 54 actuate the contact control member 59. This device is effective for shutting off the hoist should the catch not be retracted when the motor is set into operation. It will be noted that when the cable becomes slack, as under these circumstances, the members 54 will move forwardly and will break the connection with the control 59 and thus stop the motor.

Any suitable means for controlling the movement of trolleys along the tracks 16 and 17 and 20 may be employed. In the illustration given in Fig. 3, a gate 60 is provided and the same is controlled by the chain or cable 61.

The trolleys and gambrels to be lubricated are efficiently handled by supporting them upon a trolley tree which may be of any suitable construction. In Fig. 8, such a tree is indicated by the numeral 62. The trolley wheel 63 thereof may be moved along tracks 16 and 17 and upon the segmental track 20. The tree may be provided with any number of racks 64 upon which may be suspended the trolleys, gambrels, etc., which are to be lubricated.

The molten wax or wax mixture may, if desired, be circulated from the tank 10 to a filter for the removal of any foreign material therein, and the filtered material returned to the tank 10. It will be understood that any type of heating fluid may be passed through the coils 11 for the maintenance of the desired temperature therein.

*Operation*

In the operation of the apparatus and process, trolleys, gambrels, etc., may be supported upon a tree, such as tree 62 equipped with a trolley wheel 63, and the same may be conveyed along the usual tracks of a packing plant to the segmental track 20. If desired, the trolleys, gambrels, etc., may be brought by trucks to a point adjacent the segmental track 20 and there loaded upon the track 16. The tree 62 is then moved upon the segmental track 20 which is in the raised position illustrated best in Figs. 4, 6 and 7. While in the raised position, the engagement of the curved arm 48 of the locking member 44 with the plate 31 causes the arms 45 of the member 44 to be retracted and out of engagement with the trolley arm 63.

The trolley wheels 63 may be drawn upon track 20 and track 20 may be then lowered. The catches 50 are retracted by manual operation of the chain 53 and the motor 35 is set into operation to feed the cable 37 outwardly therefrom. This permits the pulley 39 to move toward the tank 10 and the cables 43 move inwardly over the pulleys 33. As the structure 22 moves downwardly, the upper curved end 48 of the actuating arm 47 ceases to engage the plate 31 and the locking member 44 swings inwardly to bring the arms 45 on each side of the trolley arm 63, thus locking it against movement in either direction.

The structure 22 is then lowered into the tank 10 and allowed to remain in the bath of molten wax for the desired period of time.

The bath mixture preferably comprises wax and oil, the wax being employed in sufficient quantity to cause the final product to set upon drying and the oil being used in sufficient quantity to serve as a lubricant while, at the same time, maintaining the wax in a plastic condition. For example, good results have been obtained by using a mixture in which paraffin wax comprises from 60–80% of the whole and oil comprises from 20–40% thereof. Excellent results have been obtained by a wax and oil mixture in which the paraffin is approximately 70% and the oil is approximately 30% of the total.

I prefer to incorporate in the wax and oil mixture from 9–15% of a high melt point microcrystalline wax. High melt wax may contain a small amount of petrolatum to render it plastic. When the high melt point wax just described is used, suitable proportions may be as follows: paraffin, 60–65%; oil, 20–30%; and high melt wax 9-15%. The above combination has a flash point over 400° F. and a fire point over 500° F. The mixture of wax may be maintained at any suitable high temperature, but a satisfactory temperature range is 280-300° F.

I prefer to have the trolley tree with the trolleys and gambrels carried thereby left in the bath sufficiently long to bring the temperature of the trolley substantially up to the temperature of the wax bath. When this is done, the coating becomes one of almost microscopic depth and is not scraped off when the fingernail is pressed along the surface of the coated trolley. Instead, the extremely thin coating tenaciously adheres to the body of the trolley and remains in position during use for long periods of time. Usually a period of five minutes or more is sufficient to bring the temperature of the trolley up to that of the bath, assuming that the temperature of the bath is from about 285-300° F. When the temperature of the trolley is substantially below that of the bath, a thick coating is formed upon the trolley and this tends to accumulate wax on the rails and makes the trolleys difficult to move along the rails.

After the dipping operation, the motor is set into operation and the hoist drum 36 causes, through the intermediate cables, the lifting of the structure 22. When the structure 22 reaches its upper position, as illustrated in Figs. 6 and 7, the curved end 48 of the actuating arm 47 strikes the plate 31 and causes the locking member 44 to swing to the outer position illustrated in Fig. 6. At the same time, the track connectors 21 join the track 20 with the adjacent tracks 16 and 17. The trolley trees 62 are then moved to the track 17 so that they rest above the drip pan 12. Blasts of air from the fans 15 aid in cooling the coated structures. After the dripping has ceased, the tree of trolleys may be moved on to another section of rail for further drying. It usually takes about three-quarters of an hour to one hour for the coating to set during this drying operation depending upon the room temperature. After drying, the trolley trees may be moved along the rail to a point where the trolleys are to be used or they may be conveyed by trucks to special points for use.

As the structure 22 is being raised and approaches its topmost position, the beam 23 strikes the cam surface of the latch members 50 and presses them outwardly until the beam 23 has cleared them and then the latches 50 swing inwardly under the beam 23 to secure the structure against dropping should the cables break.

In the lowering operation, if the latches 50 should not have been manually withdrawn, the cable 37 will immediately become slack and this allows the control members 54 to swing forwardly under the influence of springs 58, and this releases the button of control member 59 to break the motor circuit.

The apparatus has resulted in the effective lubrication of trolleys and gambrels without any spoilage of meat. There is a large saving of labor which before was required in the removal of oil-spotted portions, and a large saving in the product which, with the new apparatus, does not have to be trimmed.

While in the foregoing specification, I have set forth in great detail specific apparatus for the purpose of illustrating the invention, it will be understood that such details may be varied widely by those skilled in the art without departing from the spirit of my invention.

I claim:

1. In combination with a pair of trolley tracks spaced apart, a movable track segment between said tracks and adapted to be aligned therewith in contiguous relation, a frame extending above said track segment and to the rear thereof, a pair of guide rods carried by said frame at a spaced distance from said track, sleeves engaging said guide rods, stabilizing arms connecting said sleeves to said track segment, and lift means guided by said frame above said track segment for applying vertical lifting force to said track segment.

2. In combination with a pair of trolley tracks spaced apart, a movable track segment between said tracks and adapted to be aligned therewith in contiguous relation, a frame extending above said track segment and to the rear thereof, a pair of guide rods carried by said frame at a spaced distance from said track, sleeves engaging said guide rods, stabilizing arms connecting said sleeves to said track segment, a plurality of pulleys supported by said frame above said track segment, cables extending about said pulleys and secured to said track segment, and power-driven drum means for effecting longitudinal movement of said cables.

WILLIAM F. WEBER.

REFERENCES CITED

The following references are of record in the file of this patent:

UNITED STATES PATENTS

| Number | Name | Date |
|---|---|---|
| 104,102 | Berry | June 14, 1870 |
| 386,743 | Hedge | July 24, 1888 |
| 647,242 | Sprague | Apr. 10, 1900 |
| 682,412 | Hunt | Sept. 10, 1901 |
| 738,270 | Worcester | Sept. 8, 1903 |
| 1,150,003 | Focardi | Aug. 10, 1915 |
| 1,382,149 | Walker | June 21, 1921 |
| 1,480,790 | Stanley | Jan. 15, 1924 |
| 1,612,217 | Phillips | Dec. 28, 1926 |
| 1,865,788 | Raymond | July 5, 1932 |
| 2,072,747 | Freese | Mar. 2, 1937 |
| 2,116,430 | Gordon | May 3, 1938 |